(12) United States Patent
Preisser

(10) Patent No.: US 12,518,935 B2
(45) Date of Patent: Jan. 6, 2026

(54) SAFETY SWITCHING DEVICE

(71) Applicant: Pilz GmbH & Co. KG, Ostfildern (DE)

(72) Inventor: Frank Preisser, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 0 days.

(21) Appl. No.: 18/925,705

(22) Filed: Oct. 24, 2024

(65) Prior Publication Data
US 2025/0140490 A1    May 1, 2025

(30) Foreign Application Priority Data
Oct. 26, 2023 (DE) .......................... 102023129554.3

(51) Int. Cl.
*H01H 71/10* (2006.01)
*H01H 9/02* (2006.01)
*H01H 9/54* (2006.01)

(52) U.S. Cl.
CPC ................ *H01H 9/54* (2013.01); *H01H 9/02* (2013.01)

(58) Field of Classification Search
None
See application file for complete search history.

(56) References Cited

U.S. PATENT DOCUMENTS 7,672,109 B2 * 3/2010 Nitsche ................ H01H 47/002
                                                                          361/115
10,567,191 B2   2/2020 Pohl
2014/0300209 A1 * 10/2014 Lorenz ..................... H02H 7/00
                                                                          307/115
2019/0074146 A1 * 3/2019 Korrek ....................... H02P 3/02
2021/0202201 A1 * 7/2021 Lagree ................... H01H 71/04

FOREIGN PATENT DOCUMENTS

| DE | 102005014125 A1 | 9/2006 |
|---|---|---|
| DE | 202011004483 U1 | 1/2012 |
| DE | 102014116188 A1 | 5/2015 |
| DE | 102015120666 A1 | 6/2017 |
| DE | 102016110641 B3 | 11/2017 |
| DE | 102022124705 A1 | 3/2024 |
| EP | 3651312 A1 | 5/2020 |

\* cited by examiner

*Primary Examiner* — Rexford N Barnie
*Assistant Examiner* — Esayas G Yeshaw
(74) *Attorney, Agent, or Firm* — Miller Johnson

(57) ABSTRACT

A safety switching device includes a housing and circuitry arranged in the housing. The circuitry includes two switching elements that can be arranged in the safety circuit via a first, second, third and fourth terminal located on the housing and close the safety circuit redundantly when an actuation signal is applied to each switching element. A fifth terminal and a sixth terminal are provided on the housing, to which a first input signal and a second input signal can be applied, that correspond to the actuation signals of the switching elements, so that the safety circuit is closed when the first and second input signals are applied to the fifth and sixth terminals. The circuitry arranged in the housing includes an electrical element that extracts energy for its own operation from an electrical signal applied to at least one of the first, the third, the fifth and the sixth terminal.

20 Claims, 3 Drawing Sheets

SAFETY SWITCHING DEVICE

CROSS-REFERENCE TO RELATED APPLICATIONS

This application claims priority to German Application No. 10 2023 129 554.3 filed Oct. 26, 2023. The entire disclosure of the application referenced above is incorporated by reference.

FIELD

The present disclosure relates to a safety switching device for safety-related interruption of a safety circuit.

BACKGROUND

Safety switching devices are the origin and backbone of safe automation technology. As stand-alone devices, safety switching devices monitor safety functions such as emergency stops, safety gates, light barriers, light grids, safety mats and many more. Safety switching devices carry out defined safety functions and ensure, for example, a controlled and therefore safe stopping of a movement, position monitoring of movable guards, and stopping of a closing movement in the event of someone reaching into a protection zone. Safety switching devices minimize risk and initiate a safe and reliable reaction in the event of a fault or violation of a protection zone. Safety switching devices can be found in almost all areas of mechanical and plant engineering, primarily where the number of safety functions is manageable.

Basically, a safety switching device is a switch that switches a safety circuit on or off depending on an input signal. Input signals are supplied by safety sensors or safety transmitters (emergency stop button, light barrier, etc.) and are fed to the safety switching device when the safety sensors indicate a safe state, whereupon the safety switching device closes the safety circuit. If one of the input signals is missing, the safety switching device interrupts the safety circuit, which usually switches off a technical installation or prevents it from starting up. Alternatively, the interruption of the safety circuit can also lead to another reaction of the technical installation that brings about a safe state.

In contrast to a normal switching relay, with a safety switching device—if correctly wired—neither a fault in the device itself nor a fault caused externally by a sensor or actuator may lead to the loss of the safety function. For this purpose, a safety switching device can have additional special circuits or special relay technology compared to a normal switching relay in order to ensure a safe switching process even in the event of a fault. The typical design of a safety switching device is redundant. Two relays with forcibly guided contacts provide the safe switching contacts, which are also referred to as safe outputs or safety outputs. Two input circuits each control one of the two internal switches.

As a separate safety switching device is generally used for each safety function, the number of safety switching devices and therefore the space required in the associated control cabinet increases with each safety function of a technical installation. The increasing number of safety switching devices required leads to the demand to minimize the space required for a single safety switching device. In addition to the actual switching elements, the number of external terminals is of crucial importance in this respect. The more external terminals are required on a safety switching device, the larger the installation space required by the device.

SUMMARY

It is an object to provide an improved safety switching device that requires as little installation space as possible while providing a great possible range of functions. Furthermore, it is an object to provide an improved safety switching device that reduces a cabling effort and effectively prevents errors during cabling.

According to an aspect of the present disclosure there is provided a safety switching device having a housing and circuitry arranged in the housing. The circuitry comprises two switching elements which can be arranged in the safety circuit via a first, second, third and fourth terminal located on the housing and close the safety circuit redundantly when an actuation signal is applied to each switching element, wherein a fifth terminal and a sixth terminal are provided on the housing, to which a first input signal and a second input signal can be applied, which correspond to the actuation signals of the switching elements, so that the safety circuit is closed when the first and second input signals are applied to the fifth and sixth terminals, and wherein the circuitry arranged in the housing comprises a further electrical element which is configured to extract energy for its own operation from an electrical signal applied to at least one of the first, the third, the fifth and the sixth terminal.

It is therefore an idea of the present disclosure to provide a safety switching device that is configured to draw electrical energy from a signal applied to one of its terminals. The energy extracted is used to operate an electrical element within the safety switching device. In other words, an electrical element draws a current required for its intended use from the energy extracted from the signal.

The safety switching device can, for example, be a safety switching device that is specially designed for active sensors that actively provide an input signal from which additional energy can be drawn. In addition to controlling the internal switching elements, the energy provided can contribute to the power supply of at least one other element of the safety switching device. In this way, external terminals for a separate power supply can be dispensed with.

The reduced number of terminals allow the safety switching device to be arranged in a housing with smaller dimensions than a comparable safety switching device with external supply terminals. In particular, the width of the housing relevant to the required installation space can be reduced. It is also conceivable to use the freed-up terminals for other functions. This makes it possible, for example, to increase the number of safe outputs of the safety switching device without having to use a separate device or to use a device that provides additional external terminals for additional safe outputs. The reducible number of external terminals therefore contribute to an improvement by allowing a smaller housing to be used with the same functionality or by providing additional functionality with the same housing size. Furthermore, the reduced number of external terminals simplifies the wiring of the safety switching device and prevents wiring errors.

In a further refinement, the electrical signal can be at least one of the first input signal and the second input signal.

According to this refinement, the energy for the additional electrical element can be extracted from one or both input signals. In this case, the safety switching device can be configured for special use with active sensors. Active sensors are safe sensors that provide an input signal independently of a power supply to the safety switching device. Active sensors can have an output signal switching device (OSSD) to generate the input signal. As part of a safe sensor such as a electro-sensitive protective equipment (ESPE), output signal switching devices can provide a signal that is interrupted in a fail-safe manner if the sensor part of the safe sensor is triggered. By specializing the safety switching device for active sensors, terminals for outgoing signals that are intended for passive sensors and are supplied with a potential by the safety switching device can be omitted. Consequently, other external terminals in addition to the power supply terminals can be omitted or assigned differently when the safety switching device is specialized for active sensors.

In a further refinement, the electrical signal can be a potential that is switched by the switching elements of the safety switching device.

According to this refinement, the energy for the additional electrical element is extracted from a potential applied to the first or third terminal. The applied potential is a potential in the safety circuit that is switched through by the switching elements in the safe state. The switched potential can control contactors in a power supply of a technical installation that is monitored by the safety switching device. In this case, the electrical signal can be a 24 V DC voltage frequently used in an industrial environment. The safety switching device can use this voltage to supply power to the other electrical element.

In a further refinement, the electrical signal can be electrically isolated from the other electrical element.

According to this refinement, the safety switching device can be decoupled from the electrical signal, which protects the safety switching device from overvoltages from the electrical signal. The coupling can be an inductive or capacitive coupling. This effectively contributes to increasing the fault tolerance of the safety switching device.

In a further refinement, the additional electrical element can be an operating indicator. In various embodiments this indicator can be an LED.

Safety switching devices can have displays that indicate the operating status of the device (operating indicator). An operating indicator may be required by standards for proper operation of the safety switching device. According to a further refinement, the energy for operating the operating indicator can be extracted from the electrical signal so that no additional power supply is required for the operating indicator. This design is particularly advantageous in cases where the operating indicator is the only electrical element besides the safety switching device that needs to be actively supplied with power, as a separate power supply can be dispensed with entirely. In the case of an operating indicator, this can also be advantageously coupled directly to the corresponding input signals or the potential to be switched.

In a further refinement, the further electrical element can have a first status indicator that indicates a status of one of the switching elements.

According to this refinement, a status display of the channels (status indicator) can be supplied with an operating voltage in a simple manner, so that no separate power supply is required. This refinement can therefore also help to simplify the necessary device electronics.

In a further embodiment, the additional electrical element can be an electronic element that performs a safety-related task in the safety switching device, e.g. a microcontroller.

In this refinement, the energy absorbed by the signal can be used to supply a microcontroller that is used to control and monitor the safety switching device. According to this refinement, a separate power supply for the safety switching device can be dispensed with if the safety switching device has an extended range of functions for which a microcontroller is required.

In a further refinement, the further electrical element can be electrically connected to the first, the third, the fifth and/or the sixth terminal.

According to this refinement, the further electrical element is connected to one or more terminals to which an electrical signal can be applied. Depending on the type of electrical signal, the electrical element can be connected to the terminals directly or via an additional component. In this way, a power supply can be realized simply and efficiently using externally applied signals.

In a further refinement, the safety switching device can have an electrical component that is connected to the further electrical element and provides a voltage and/or power supply for operating the further electrical element.

According to this refinement, a further electrical component can be provided, which converts the energy received from the electrical signal for the operation of the further electrical element. The electrical component can be a resistor to which a voltage is applied and which acts as a current source for an LED, for example. It is also possible to use a rectifier or a voltage regulator. This design enables a wider range of possible electrical signals that can be used as an energy source.

In a further refinement, the safety switching device can have an energy storage device that buffers the energy for operating the further electrical element, with the electrical signal charging the energy storage device.

According to this refinement, an energy storage device can be provided upstream of the additional electrical element in order to provide the energy required for the electrical element. The energy storage device can be an inductive or capacitive component that buffers or smoothes the voltage or current required for the operation of the other electrical component. This means that different electrical signals can be used as an energy source. This design therefore contributes to the effective adaptation of the device to a larger number of electrical signals.

In a further refinement, a seventh terminal can be provided on the housing, to which a reference potential for the electronics can be connected.

According to this refinement, at least one additional terminal can be provided in order to make a uniform reference potential available. The reference potential can be used to easily generate a supply voltage from the electrical signal if this corresponds to a potential. It goes without saying that a potential connected to the second or fourth terminal can also be used as a reference potential without the need for a seventh terminal.

In a further refinement, the additional electrical element can be powered exclusively from the energy extracted from the electrical signal.

According to this refinement, no further energy source is therefore required to operate the additional electrical element. The refinement is therefore particularly advantageous for reducing external terminals and simplifying the circuitry.

In a further embodiment, the housing can have two side surfaces and a plurality of functional surfaces connecting the side surfaces, which together define an enclosed space in which the circuitry is arranged, wherein a distance between the side surfaces defines a maximum width of the housing and the terminals are arranged on the functional surfaces. The maximum width may be equal to or less than 22.5 mm.

Safety switching devices can have a housing that is suitable for installation in a switch cabinet. Such a housing usually has a width that is many times smaller than the depth and height of the housing. The housing can, for example, be box-shaped with two side surfaces and four functional surfaces connecting the side surfaces. One of the functional surfaces (front surface) faces the user when properly installed in a switch cabinet and carries the external terminals. The two side surfaces define the width of the housing. Thus, the reduction of external terminals makes it possible to reduce the width of the housing.

It goes without saying that the features mentioned above and those to be explained below can be used not only in the combination indicated in each case, but also in other combinations or on their own, without leaving the scope of the present disclosure.

BRIEF DESCRIPTION OF THE DRAWINGS

Embodiments of the disclosure are shown in the drawings and are explained in more detail in the following description.

DETAILED DESCRIPTION

Figure 1:
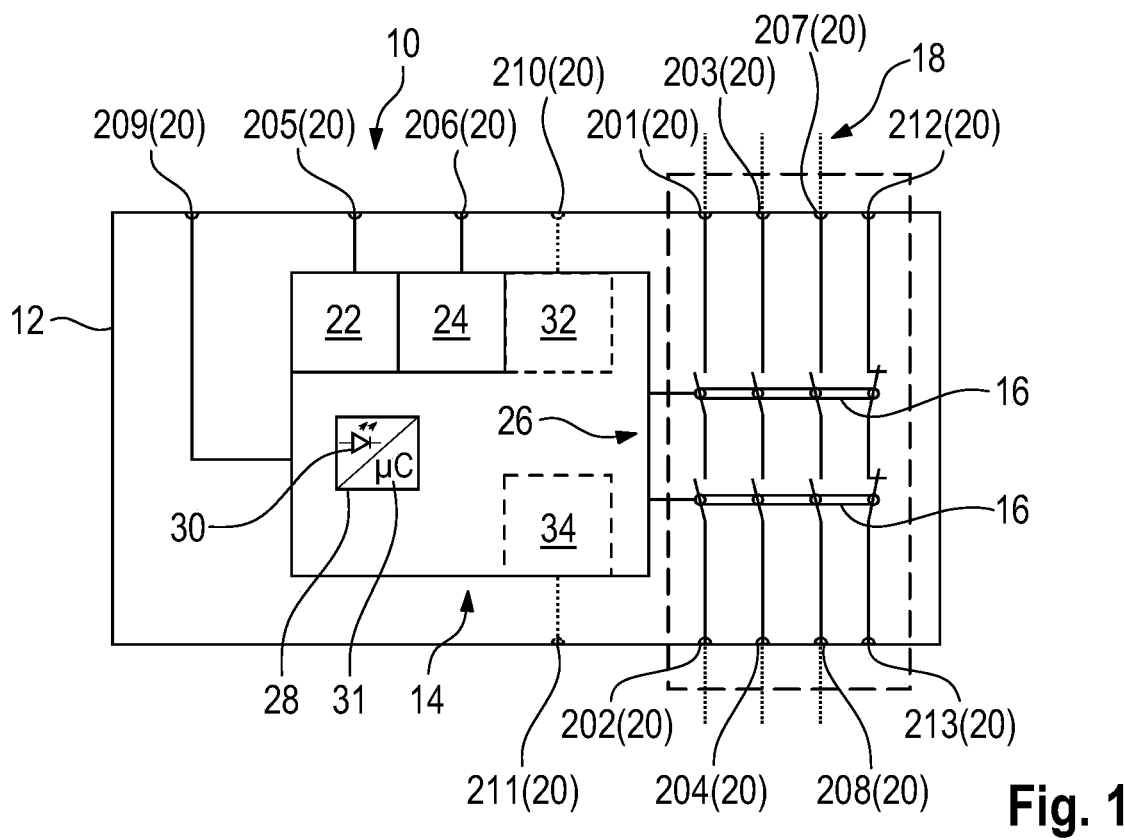
FIG. 1 shows a schematic representation of a safety switching device according to a first embodiment of the present disclosure.

FIG. 1 shows a safety switching device according to a first embodiment of the present disclosure in a schematic representation. The safety switching device is designated here in its entirety with reference number 10.

The safety switching device 10 has a housing 12 and circuitry (electronics) 14 arranged in the housing 12. The circuitry 14 comprises two switching elements 16 whose contacts can be arranged in a safety circuit 18. In various embodiments, the switching elements 16 can be forcibly guided relays. The contacts of the two switching elements 16 are routed to the outside via terminals 20 on the housing 12. The safety switching device 10 has at least a first terminal 201, a second terminal 202, a third terminal 203 and a fourth terminal 204 in order to route the safety circuit redundantly via the contacts of the switching elements 16.

Furthermore, the safety switching device 10 has a first input circuit 22 and a second input circuit 24, which can also be contacted from the outside via terminals 20 on the housing 12. The first input circuit 22 is externally connectable via a fifth terminal 205 and the second input circuit 24 is externally connectable via a sixth terminal 206, wherein the input circuits 22, 24 are externally connectable exclusively via the fifth and sixth terminals 205, 206. A first input signal from a safety sensor (not shown here) can be received via the fifth terminal 205 and a second input signal from the safety sensor (not shown here) can be received via the sixth terminal 206. The first and second input signals are then present at the fifth and sixth terminals 205, 206 of the safety switching device 10 when the safety sensor signals a safe state of a technical installation to be monitored.

When the first and second input signals are properly applied to the fifth and sixth terminals 205, 206, the input circuits 22, 24 provide an actuation signal 26 to the two switching elements 16, based on which the switching elements 16 close the safety circuit 18. If one of the input signals is not present or if the safety switching device 10 detects a fault in the input signal or other devices of the safety switching device 10 in any other way, no actuation signal 26 is provided, so that the switching elements 16 interrupt the safety circuit 18 and thus force a safe state to be brought about on the technical installation to be monitored.

The safety switching device 10 also comprises a further electrical element 28. The further electrical element 28 can be part of the circuitry 14 and can, for example, be arranged on a common circuit board together with the switching elements 16 and the input circuits 22, 24. The further electrical element 28 can be an electrical or electronic component that performs a function of the safety switching device 10 in addition to the switching elements 16. In various embodiments, the further electrical element 28 can be a display (indicator), which is realized, for example, by one or more light-emitting diodes 30. Alternatively or additionally, the further electrical element 28 can also be a control element, such as a microcontroller 31 or an FPGA, and assume control functions of the safety switching device. Such a control element could, for example, perform additional safety-related tasks of the safety switching device 10, such as a continuous comparison of the input signals, cross-circuit detection or diagnostic functions. Of course, the further electrical element 28 is not limited to these functions.

The further electrical element 28 is configured to extract energy for its own operation from an electrical signal applied to at least one of the first, third, fifth and/or sixth terminal 201, 203, 205, 206. The electrical signal can correspond to one or both input signals or a signal routed via the safety circuit 18. The electrical signal can, for example, be a static potential applied to the aforementioned terminals, from which energy can be drawn directly. Alternatively, dynamic signals (clock signals) can also be applied to the terminals, from which energy can be drawn from static components or as effective values.

The further electrical element 28 can be a safety-related device that contributes to fulfilling the normative requirements that can be placed on the safety switching device. For example, it is conceivable that a safety switching device only meets the normative requirements if the safety switching device can visualize its status or the status of the switching elements (channels) by means of an operating indicator or status indicator. It is also conceivable that, in addition to the safe switching of the safety circuit, the safety switching device must perform other functions that are provided by an electrical (integrated) circuit to fulfil a certain safety level.

Regardless of the type of the further electrical element 28, the energy required for the further electrical element 28 is taken from the electrical signal present at the aforementioned terminals. The safety switching device has no additional power supply, such as a voltage or current source, to operate the further electrical element 28. By dispensing with an additional power supply for the additional electrical element 28, the external terminals provided for this purpose on the housing 12 can be advantageously omitted or used for other purposes.

Additional terminals can also be saved in the present safety switching device compared to known safety switching devices by assuming that the safety sensors connected to the input circuits 22, 24 are active safety sensors. Active safety sensors are characterized by the fact that they can provide an input signal independently of the safety switching device 10. In other words, these are devices that have their own power supply and are equipped with an output signal switching device (OSSD) that can provide a safe input signal depending on a sensor part of the safety sensor. In contrast to passive safety sensors, such as emergency stop buttons, active safety sensors are not dependent on the safety switching device providing a switching potential for the safety sensors. Accordingly, by specializing in active sensors, there is no need for additional terminals on the housing to provide switching potentials. Each input circuit therefore only requires one connection on the housing to receive the input signal of an active safety sensor.

The restriction to active safety sensors also has the advantage that, depending on the function, an electrical signal is applied to the safety switching device as an input signal, from which energy can be drawn that is not provided by the safety switching device. In the case of an output signal switching device (OSSD), the input signal provided is referred to as OSSD signal, the electrical properties of which are usually specified in standards for various applications. It is therefore easy to supply power to the other electrical element based on an OSSD signal, as the power supply can be adapted to the electrical properties. The further electrical element 28 can be selected, for example, so that it can be coupled directly to the OSSD signal in order to be energized when the OSSD signal is present. However, it is also conceivable that a further component is provided which is connected between the terminal of the electrical signal and the further electrical element 28 or in parallel with the further electrical element 28 in order to set a suitable voltage supply for the further electrical element 28. The other component can be a simple resistor or a rectifying element such as a diode. Furthermore, a voltage regulator can be connected between the terminal of the electrical signal and the further electrical element 28 in order to set a defined and constant voltage at the further electrical element 28. However, the present disclosure is not limited to any particular form of energy extraction.

In addition to the aforementioned first to sixth terminals 201-206, the safety switching device can optionally have further terminals, as shown in the embodiment illustrated here. For example, the safety switching device can have a seventh terminal 207 and an eighth terminal 208. The seventh and eighth terminals 207, 208 form a further safe output, analogous to the two safe outputs formed by the first and second terminals 201, 202 and the third and fourth terminals 203, 204. A safe output is thus formed by two terminals 20 in each case, which are connected via the switching contacts of the switching elements 16. As shown here, the safety switching device 10 can have three safe outputs.

A ninth terminal 209 may also be provided on the safety switching device 10, which is coupled to the circuitry 14 of the safety switching device 10. For example, a reference potential can be applied to the ninth terminal 209, with which a supply voltage for the other electrical element 28 is jointly formed. The reference potential can, for example, be a common earth potential for the circuitry 14. In principle, such a potential could also be applied to the second or fourth terminal, so that no additional terminal would be required, although measures would then have to be taken to galvanically decouple the reference potential from the other circuitry 14.

In addition, the safety switching device 10 can have further devices, circuits and terminals, as indicated by the dotted lines in the present embodiment. Another circuit can be a start circuit 32, for example, which can be used to control a switch-on process. The start circuit 32 can receive a start signal via a tenth terminal 210 and be designed in such a way that the switching elements 26 only close the safety circuit 18 when the start signal is present. A diagnostic device 34 is also conceivable, which provides a signal at an eleventh terminal 211 that signals the current switching state of the switching elements.

Finally, the safety switching device 10 can also have a twelfth and a thirteenth terminal 212, 213, which, like the safe outputs (terminals 201-204; 207-208), are connected via the contacts of the switching element 16, but not via positively driven normally open (NO) contacts, but via positively driven normally closed (NC) contacts. Normally open (NO) contacts are contacts that close a connection between the contacts when the switching element is actuated, i.e. when switched on, and normally closed (NC) contacts are contacts that open a connection between the contacts when the switching element is actuated. The twelfth and thirteenth terminals 212, 213 can be used as feedback circuits and can be connected to the start circuit 32, for example, in order to prevent a faulty restart.

According to the first embodiment, the safety switching device 10 can have thirteen terminals, as shown here. However, as shown above, six terminals are sufficient for the primary function of the safety switching device 10, namely the safe interruption of a safety circuit depending on redundant input signals. In the safety switching device 10 according to the first embodiment, the housing 12 can therefore be reduced in size compared to a safety switching device that usually has ten or more external terminals for providing the primary function. Alternatively or additionally, free terminals can be used for other tasks. An example of this is shown in FIG. 2.

Figure 2:
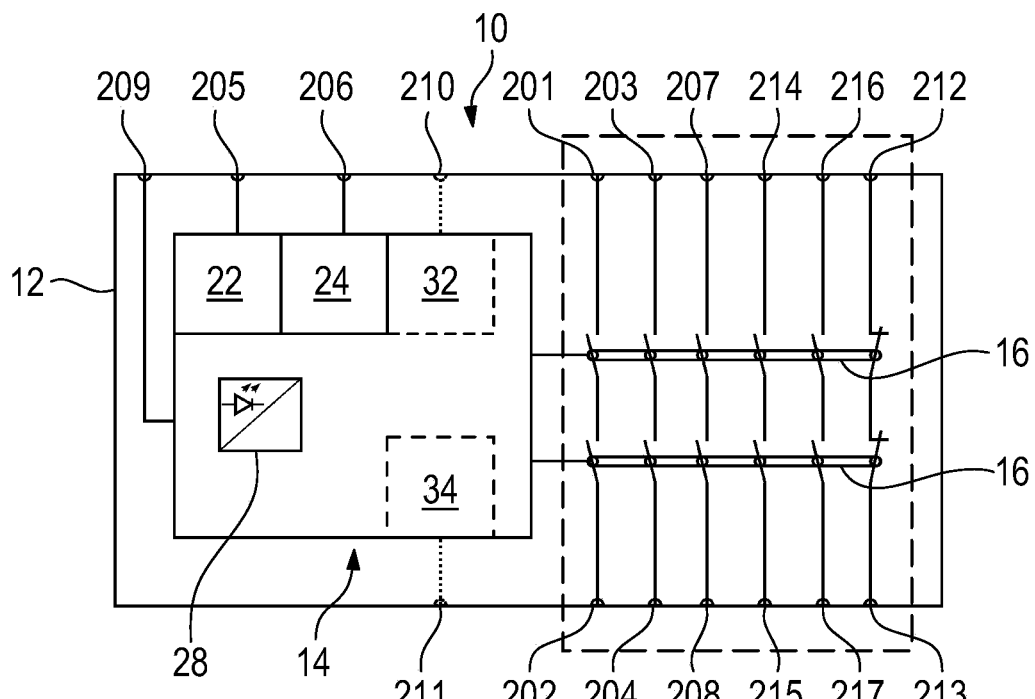
FIG. 2 shows a schematic representation of a safety switching device according to a second embodiment of the present disclosure.

FIG. 2 shows a safety switching device according to a second embodiment of the present disclosure in a schematic representation. The safety switching device is designated here in its entirety with reference number 10.

In FIG. 2, elements with the same function are denoted with the same reference numbers as in FIG. 1 and a detailed description of these elements is omitted.

The safety switching device 10 according to the second embodiment has a housing 12, circuitry 14, two switching elements 16, a plurality of terminals 20 and a first and a second input circuit 22, 24. The plurality of terminals 20 includes the first to sixth terminals 201-206. Furthermore, the safety switching device 10 has the further electrical element 28 which, as previously described with respect to the first embodiment, extracts energy for its own operation from an electrical signal present at the first, third, fifth or sixth terminal.

As in the first embodiment, the seventh to thirteenth terminals 207-213 may optionally be provided in the same way in the second embodiment.

The second embodiment differs from the first embodiment in the design of the switching elements 16. The switching elements 16 here have further positively driven NO contacts, which are guided to the outside of the housing 12 via a fourteenth, fifteenth, sixteenth and seventeenth terminal 214, 215, 216, 217. The fourteenth and fifteenth terminals 214,

215 form a fourth safe output and the sixteenth and seventeenth terminals 216, 217 form a fifth safe output of the safety switching device 10.

In the safety switching device 10 according to the second embodiment, five safe outputs can be provided without significantly increasing the number of external terminals 20 compared to a safety switching device from the prior art. This is possible by eliminating or freeing up external terminals in the input circuits or in a power supply of the safety switching device as a result of the energy extraction described.

Figure 3:
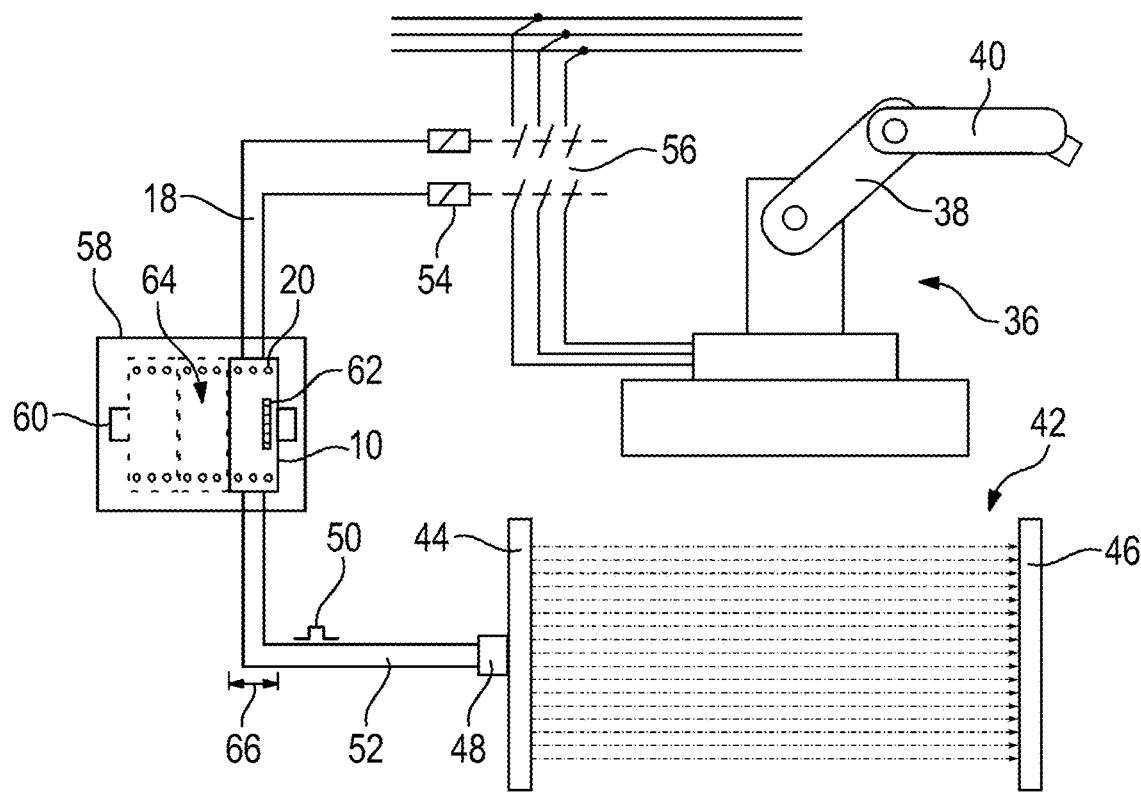
FIG. 3 shows a simplified schematic representation of an application scenario for a safety switching device according to the present disclosure.

FIG. 3 shows a simplified schematic representation of a possible application scenario for a safety switching device 10 according to the present disclosure.

FIG. 3 shows an automated robot 38 as the technical installation 36 to be monitored. The robot 38 has a defined working area in which the robot arm 40 can move. Access to the work area is safeguarded by a safety sensor. The safety sensor here is a non-contact protective device (ESPE) in the form of a light grid 42. The light grid 42 has a first component 44 and a second component 46, between which light beams can be exchanged. The light grid 42 only signals a safe state if the light beams are exchanged in a defined manner and no other error has occurred in the light grid 42. The signaling takes place via an output signal switching device (OSSD) 48, which provides a redundant output signal (OSSD signal 50) when the light grid 42 is operating correctly and no access to the technical installation 36 has been registered.

A safety switching device 10 according to an embodiment of the present disclosure is connected to the output signal switching device 48 of the light grid 42, for example, via a cable 52. Consequently, the safety switching device 10 receives an OSSD signal 50 redundantly as a first input signal and as a second input signal and switches the switching elements 16 as a function thereof. The switching elements 16 are arranged in a safety circuit 18 in the manner described above, so that redundant contactors 54 are energized when the OSSD signal 50 is provided by the light grid 42. The normally open contacts 56 of the contactors 54 can in turn be arranged in a power supply of the technical installation 36, so that power is supplied to the technical installation 36 only if and as long as the output signal switching device 48 provides the OSSD signal 50. In this way, the safety switching device 10, in conjunction with the light grid 42, provides a safety function that monitors access to the technical installation 36.

The safety switching device 10 can be arranged together with other control devices in a control cabinet 58. In particular, further safety switching devices can be arranged in the control cabinet 58, via which additional safety functions can be realized. The other safety switching devices are shown here with dashed lines. The individual safety switching devices can be arranged next to each other on a top-hat rail 60. The terminals 20 for the wiring as well as additional indicators 62 are each arranged on front surfaces 64 of the safety switching devices, which face a user after installation in the switch cabinet 58. A width of the front surfaces 64 essentially defines the required installation width 66 of a safety switching device and is essentially dependent on the number of required terminals 20 on the respective front surface 64. A standard dimension for the installation width 66 of a single safety switching device is, for example, 22.5 mm.

By reducing the number of external terminals 20 on the safety switching devices according to the present disclosure, the actual installation space required for the safety switching devices in the control cabinet 58 can thus be reduced. At the same time, wiring is simplified if no external power supply is required for the safety switching devices. In principle, the reduced number of terminals 20 can effectively reduce wiring errors.

Figure 4:
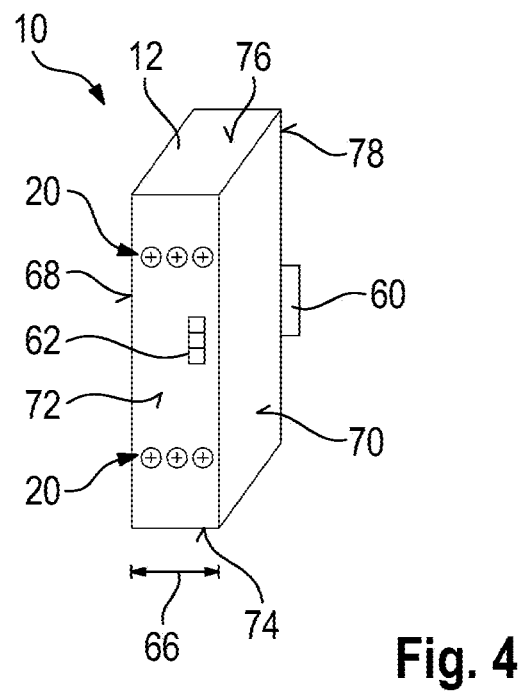
FIG. 4 shows a simplified perspective view of an embodiment of a housing of a safety switching device according to the present disclosure.

FIG. 4 shows a simplified perspective view of an embodiment of a housing of a safety switching device according to the present disclosure.

According to FIG. 4, the safety switching device 10 is arranged in an essentially rectangular housing 12. The box-shaped housing 12 has two opposing side surfaces 68, 70 and, in this example, four functional surfaces 72, 74, 76, 78 connecting the side surfaces 68, 70. The functional surface 72 corresponds to a front surface 64 of the safety switching device 10 when the safety switching device 10 is mounted as intended in a control cabinet. For mounting, the housing 12 can have, for example, a holder for mounting on a top-hat rail 60 on a functional surface 78 opposite the front surface 64.

The main operating and indicator elements as well as the external terminals 20 of the safety switching device are arranged on the functional surface 72, which serves as the front surface and faces a user after installation in a control cabinet. In the present embodiment, six external terminals 20 and a display element 62 are provided on the front surface 72 of the safety switching device 10. The six external terminals 20 can correspond to the first to sixth terminals 201-206 described above and can be realized, for example, by screw or spring-loaded terminals commonly used in automation technology. The indicators 62 can, for example, have three indicators that show the operating state of the safety switching device as a whole and individual states of the two switching elements. The indicators 62 may be regarded as further electrical elements 28 within the meaning of the present disclosure and a power supply for the indicators can be provided via an electrical signal applied to the terminals 201 to 206 in the manner described above.

By reducing the number of external terminals 20 in the manner described above, an installation width 66 corresponding to a maximum distance between the side surfaces 68, 70 can be reduced if the terminals 20 are arranged on the front surface 72 of the housing 12 in the manner customary in automation technology. In this way, a safety switching device 10 can be provided that is suitable for special safety functions, for example in conjunction with ESPE, as shown in FIG. 3, and has a smaller width 66 than comparable standard devices. In addition, wiring costs and wiring errors can be reduced by such a safety switching device.

Figure 5:
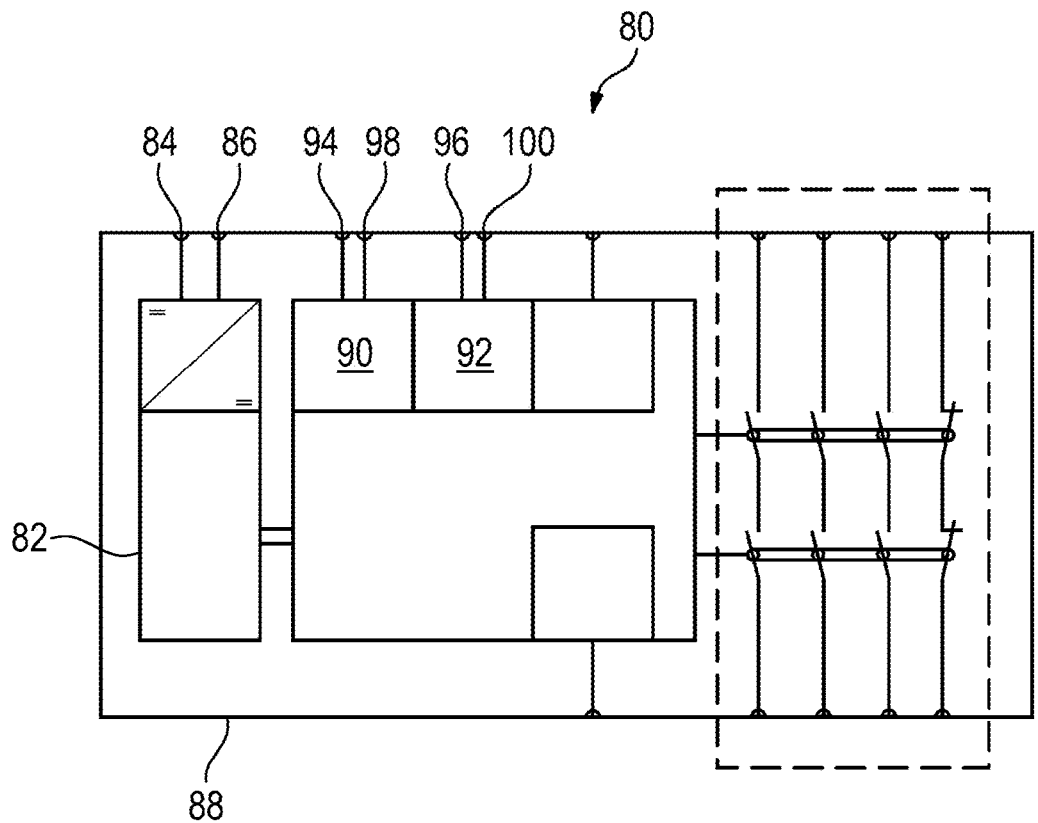
FIG. 5 shows a reference example of a safety switching device according to the state of the art.

Finally, FIG. 5 shows a reference example of a safety switching device 80 according to the state of the art. The safety switching device 80 differs from the safety switching device 10 according to the first embodiment of the present disclosure by a power supply 82 for the internal circuitry, which can be coupled to an external power supply via two terminals 84, 86 on the housing 88.

In addition, the reference example differs in that there are no corresponding devices for the previously described energy extraction from an electrical signal applied to the other terminals and the use of the extracted energy to supply an electrical element of the safety switching device that does not correspond to the switching elements. Rather, electrical elements within the meaning of the present disclosure are supplied by the additional power supply 82 in the prior art safety switching device 80.

The prior art safety switching device 80 further comprises two input circuits 90, 92, each having two external terminals on the housing 88. The additional terminals 94, 96 to the input circuits 22, 24 are used to provide output signals which can be switched via passive safety sensors and fed back to the inputs 98, 100. The safety relay 80 is therefore not designed for special use with active safety sensors, but for general use with passive or active safety sensors.

The safety switching devices 10 according to the first and second embodiments are characterized by a reduced number of external terminals or by a different assignment of the available terminals. It goes without saying, however, that the embodiments only represent the subject matter of the invention by way of example and that the invention is defined solely by the following claims.

The phrase at least one of A, B, and C should be construed to mean a logical (A OR B OR C), using a non-exclusive logical OR, and should not be construed to mean "at least one of A, at least one of B, and at least one of C."

What is claimed is:

1. A safety switching device for safety-related interruption of a safety circuit, the safety switching device comprising:
    a housing; and
    circuitry arranged in the housing,
    wherein the circuitry includes two switching elements that can be arranged in the safety circuit via a first, second, third and fourth terminal located on the housing and close the safety circuit redundantly when an actuation signal is present at each switching element,
    wherein a fifth terminal and a sixth terminal are provided on the housing, to which a first input signal and a second input signal can be applied, that correspond to the actuation signals of the switching elements, so that the safety circuit is closed when the first and second input signals are applied to the fifth and sixth terminals, and
    wherein the circuitry includes an electrical element that is configured to extract energy for its own operation from an electrical signal applied to at least one of the first, the third, the fifth, and the sixth terminal.

2. The safety switching device of claim 1, wherein the electrical signal is either one of the first input signal and the second input signal.

3. The safety switching device of claim 1, wherein the electrical signal is a potential that is switched by the switching elements.

4. The safety switching device of claim 1, wherein the electrical signal is electrically isolated from the electrical element.

5. The safety switching device of claim 1, wherein the electrical element includes an operating indicator.

6. The safety switching device of claim 1, wherein the electrical element is an LED.

7. The safety switching device of claim 1, wherein the electrical element includes a first status indicator indicating a status of one of the switching elements.

8. The safety switching device of claim 1, wherein the electrical element is an electronic element configured to perform a safety-related task of the safety switching device.

9. The safety switching device of claim 1, wherein the electrical element is a microcontroller.

10. The safety switching device of claim 1, wherein the electrical element is electrically connected to one of the first, the third, the fifth, and the sixth terminal.

11. The safety switching device of claim 1, further comprising: an electrical component connected to the electrical element and establishing at least one of a voltage supply and a power supply for operating the electrical element.

12. The safety switching device of claim 1, further comprising:
    an energy storage device that buffers the energy for operating the electrical element,
    wherein the electrical signal charges the energy storage device.

13. The safety switching device of claim 1, wherein a seventh terminal is provided on the housing and configured to connect to a reference potential for the circuitry.

14. The safety switching device of claim 1, wherein the electrical element is powered exclusively from the energy extracted from the electrical signal.

15. The safety switching device of claim 1, wherein:
    the housing has two side surfaces and a plurality of functional surfaces connecting the side surfaces, that together define an enclosed space in which the circuitry is arranged, and
    a spacing of the side surfaces defines a maximum width of the housing and the terminals are arranged on one of the functional surfaces.

16. The safety switching device of claim 15, wherein the maximum width is equal to or less than 22.5 mm.

17. The safety switching device of claim 1, wherein:
    the first, second, third, and fourth terminals located on the housing represent two safe outputs, each of which can interrupt the safety circuit, and
    six further terminals are provided on the housing, that together form three further safe outputs.

18. The safety switching device of claim 1, wherein the first input signal is a coded signal and is provided by an output signal switching device of a protective device.

19. The safety switching device of claim 18, wherein:
    the coded signal is an OSSD signal, and
    the protective device is a contactless protective device.

20. The safety switching device of claim 1, wherein at least one of the terminals of the safety switching device is a screw terminal or a spring terminal.

* * * * *